(12) United States Patent
Jalan et al.

(10) Patent No.: US 11,190,542 B2
(45) Date of Patent: Nov. 30, 2021

(54) NETWORK SESSION TRAFFIC BEHAVIOR LEARNING SYSTEM

(71) Applicant: A10 Networks, Inc., San Jose, CA (US)

(72) Inventors: Rajkumar Jalan, Saratoga, CA (US); Tony Tseng, San Jose, CA (US); Kien Le, San Jose, CA (US); Gopi Krishna Marella, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 449 days.

(21) Appl. No.: 16/167,405

(22) Filed: Oct. 22, 2018

(65) Prior Publication Data
US 2020/0128039 A1    Apr. 23, 2020

(51) Int. Cl.
*H04L 29/06*     (2006.01)
*H04L 12/823*    (2013.01)
*H04L 12/24*     (2006.01)

(52) U.S. Cl.
CPC ........ *H04L 63/1458* (2013.01); *H04L 41/142* (2013.01); *H04L 47/32* (2013.01); *H04L 63/101* (2013.01); *H04L 63/126* (2013.01); *H04L 63/1416* (2013.01); *H04L 63/1425* (2013.01)

(58) Field of Classification Search
CPC ... H04L 63/1458; H04L 41/142; H04L 47/32; H04L 63/101; H04L 63/126; H04L 63/1416; H04L 63/1425
See application file for complete search history.

(56) References Cited

U.S. PATENT DOCUMENTS

| | | | |
|---|---|---|---|
| 7,593,936 B2 | 9/2009 | Hooks | |
| 8,195,750 B1* | 6/2012 | Bakhmutov | H04L 63/1441 709/206 |
| 8,839,417 B1* | 9/2014 | Jordan | H04L 63/0245 726/22 |
| 8,984,331 B2 | 3/2015 | Quinn | |
| 9,258,217 B2* | 2/2016 | Duffield | H04L 41/16 |

(Continued)

OTHER PUBLICATIONS

NPL Search (Google Scholar) (Year: 2021).*

(Continued)

*Primary Examiner* — Mahfuzur Rahman
(74) *Attorney, Agent, or Firm* — Keith Kline; The Kline Law Firm PC

(57) ABSTRACT

Provided is a method for identifying suspicious traffic. The method may commence with compiling statistical data for a plurality of hosts. The method may further include generating data lists for with the plurality of hosts based on the statistical data. The method may continue with receiving a data packet from a host of the plurality of hosts. The data packet may be associated with a plurality of parameters. The method may further include analyzing one or more of the plurality of parameters associated with the data packet using the data lists. The method may continue with determining, based on the analysis, that the one or more of the plurality of parameters are outside a predetermined tolerance zone. Based on the determination that the one or more of the plurality of parameters are outside the predetermined tolerance zone, a mitigation action associated with the host may be selectively initiated.

15 Claims, 9 Drawing Sheets

(56) References Cited

U.S. PATENT DOCUMENTS

| | | | |
|---|---|---|---|
| 9,332,024 B1* | 5/2016 | Gulko | G06F 21/552 |
| 2003/0033403 A1* | 2/2003 | Rhodes | H04L 43/02 |
| | | | 709/224 |
| 2004/0250124 A1 | 12/2004 | Chesla et al. | |
| 2005/0022010 A1* | 1/2005 | Swander | H04L 63/0218 |
| | | | 726/4 |
| 2005/0223089 A1* | 10/2005 | Rhodes | H04L 43/0876 |
| | | | 709/223 |
| 2005/0234920 A1* | 10/2005 | Rhodes | G06F 21/552 |
| 2006/0026678 A1 | 2/2006 | Zakas | |
| 2006/0140369 A1* | 6/2006 | Altmann | H04M 15/42 |
| | | | 379/114.13 |
| 2006/0141983 A1* | 6/2006 | Jagannathan | H04L 12/145 |
| | | | 455/406 |
| 2007/0245420 A1 | 10/2007 | Yong et al. | |
| 2010/0125900 A1* | 5/2010 | Dennerline | H04L 63/1416 |
| | | | 726/13 |
| 2010/0138301 A1* | 6/2010 | Affannato | H04L 65/4084 |
| | | | 705/14.58 |
| 2014/0143868 A1* | 5/2014 | Shiva | G06F 21/552 |
| | | | 726/23 |
| 2014/0269339 A1* | 9/2014 | Jaafar | H04L 41/142 |
| | | | 370/241 |
| 2014/0280902 A1* | 9/2014 | Szamonek | H04L 61/2007 |
| | | | 709/224 |
| 2014/0359277 A1* | 12/2014 | McGrew | H04L 63/0245 |
| | | | 713/154 |
| 2016/0283348 A1* | 9/2016 | Golde | G06F 8/70 |
| 2018/0063161 A1* | 3/2018 | Kopp | H04L 63/1416 |
| 2018/0220278 A1* | 8/2018 | Tal | G06Q 20/065 |
| 2020/0028856 A1* | 1/2020 | Kaplan Haelion | |
| | | | H04L 61/6063 |
| 2020/0076840 A1* | 3/2020 | Peinador | G06F 16/80 |
| 2020/0099703 A1* | 3/2020 | Singh | H04L 63/1416 |
| 2020/0128039 A1* | 4/2020 | Jalan | H04L 47/32 |

OTHER PUBLICATIONS

NPL Search (InnovationQ) (Year: 2021).*

X. Jing, Z. Yan and W. Pedrycz, "Security Data Collection and Data Analytics in the Internet: A Survey," in IEEE Communications Surveys & Tutorials, vol. 21, No. 1, pp. 586-618 (Year: 2019).*

K. Bavani, M. P. Ramkumar and E. Selvan G.S.R., "Statistical Approach Based Detection of Distributed Denial of Service Attack in a Software Defined Network," 2020 6th International Conference on Advanced Computing and Communication Systems (ICACCS), 2020, pp. 380-385 (Year: 2020).*

* cited by examiner

```
                    300
```

```
┌─────────────────────────────────────────┐
│  COMPILE STATISTICAL DATA FOR A PLURALITY OF│
│                  HOSTS                   │
│                   302                    │
└─────────────────────────────────────────┘
                     │
                     ▼
┌─────────────────────────────────────────┐
│  BASED ON THE STATISTICAL DATA, GENERATE DATA│
│     LISTS FOR WITH THE PLURALITY OF HOSTS │
│                   304                    │
└─────────────────────────────────────────┘
                     │
                     ▼
┌─────────────────────────────────────────┐
│  RECEIVE A DATA PACKET FROM A HOST, THE DATA│
│  PACKET BEING ASSOCIATED WITH A PLURALITY OF│
│                PARAMETERS                │
│                   306                    │
└─────────────────────────────────────────┘
                     │
                     ▼
┌─────────────────────────────────────────┐
│    ANALYZE ONE OR MORE OF THE PLURALITY OF│
│  PARAMETERS ASSOCIATED WITH THE DATA PACKET│
│            USING THE DATA LISTS          │
│                   308                    │
└─────────────────────────────────────────┘
                     │
                     ▼
┌─────────────────────────────────────────┐
│  BASED ON THE ANALYSIS, DETERMINE THAT THE ONE│
│   OR MORE OF THE PLURALITY OF PARAMETERS ARE│
│    OUTSIDE A PREDETERMINED TOLERANCE ZONE│
│                   310                    │
└─────────────────────────────────────────┘
                     │
                     ▼
┌─────────────────────────────────────────┐
│ BASED ON THE DETERMINATION, SELECTIVELY INITIATE│
│  A MITIGATION ACTION ASSOCIATED WITH THE HOST│
│                   312                    │
└─────────────────────────────────────────┘
```

FIG. 3

NETWORK SESSION TRAFFIC BEHAVIOR LEARNING SYSTEM

TECHNICAL FIELD

This invention relates generally to data network and more particularly to network appliances for learning network session traffic behavior.

BACKGROUND

A Denial of Service (DOS) attack is a very common form of data network attacks affecting network services and servers. Traditional DOS attacks such as Transmission Control Protocol (TCP) synchronization (SYN) flooding have been addressed by threat protection systems, which examine and discard the attack TCP SYN data packets when the attack data packets are not followed by normal TCP session data packets.

However, there is a new form of network threats such as reflection DOS attacks where attacking network devices trick otherwise valid network hosts into bombarding other hosts with network data packets which appear to be valid data packets coming from valid sources. Examples of reflection DOS attacks include Domain Name System (DNS) reflection attacks, DNS amplification attacks, and TCP reflection attacks. In a scenario of a TCP SYN+acknowledgement (ACK) reflection attack, an attacking network device tricks a valid network host into initiating a TCP session with a targeted network server.

The targeted network server may try to establish a TCP session with the network host according to the TCP protocol. When the attacking network device tricks a sufficiently large number of network hosts into sending TCP SYN+ACK data packets to the targeted network server to initiate a Distributed DoS (DDoS) attack on the targeted network server, the targeted network server will exhaust computing resources while trying to establish TCP sessions with these network hosts. The targeted network server then fails due to computing resource exhaustion.

Conventional threat protection systems are not very efficient when dealing with these types of attacks because the attacks appear to be perpetrated by valid sources. Thus, there is a need for a protection system that learns network data traffic behavior over a period of time and dynamically addresses network threats based on changes in the network data traffic.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for identifying suspicious traffic. According to one approach of the present disclosure, a system for identifying suspicious traffic is provided. Specifically, the system for identifying suspicious traffic may include at least one traffic learning appliance, a security controller, and a storage node. The at least one traffic learning appliance may be configured to compile statistical data for a plurality of hosts. Based on the statistical data, the at least one traffic learning appliance generates data lists associated with the plurality of hosts. The security controller can be configured to receive a data packet from a host of the plurality of hosts. The data packet may be associated with a plurality of parameters. The security controller may be configured to analyze one or more of the plurality of parameters of the data packet using the data lists. Based on the analysis, the security controller may determine that the one or more of the plurality of parameters are outside a predetermined tolerance zone. Based on the determination, the security controller may selectively initiate a mitigation action.

According to another approach of the present disclosure, a method for identifying suspicious traffic is provided. The method may commence with compiling statistical data for a plurality of hosts. The method may further include generating data lists for the plurality of hosts based on the statistical data. The method may then proceed with receiving a data packet from a host of the plurality of hosts. The data packet may be associated with a plurality of parameters. The method may further include analyzing one or more of the plurality of parameters associated with the data packet using the data lists. The method may then proceed with determining, based on the analysis, that the one or more of the plurality of parameters are outside a predetermined tolerance zone. Based on the determination that the one or more of the plurality of parameters are outside the predetermined tolerance zone, a mitigation action with respect to the host may be selectively initiated.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

FIG. 3 shows a process flow diagram of a method for identifying suspicious traffic, according to an example embodiment.

DETAILED DESCRIPTION

Figure 1:
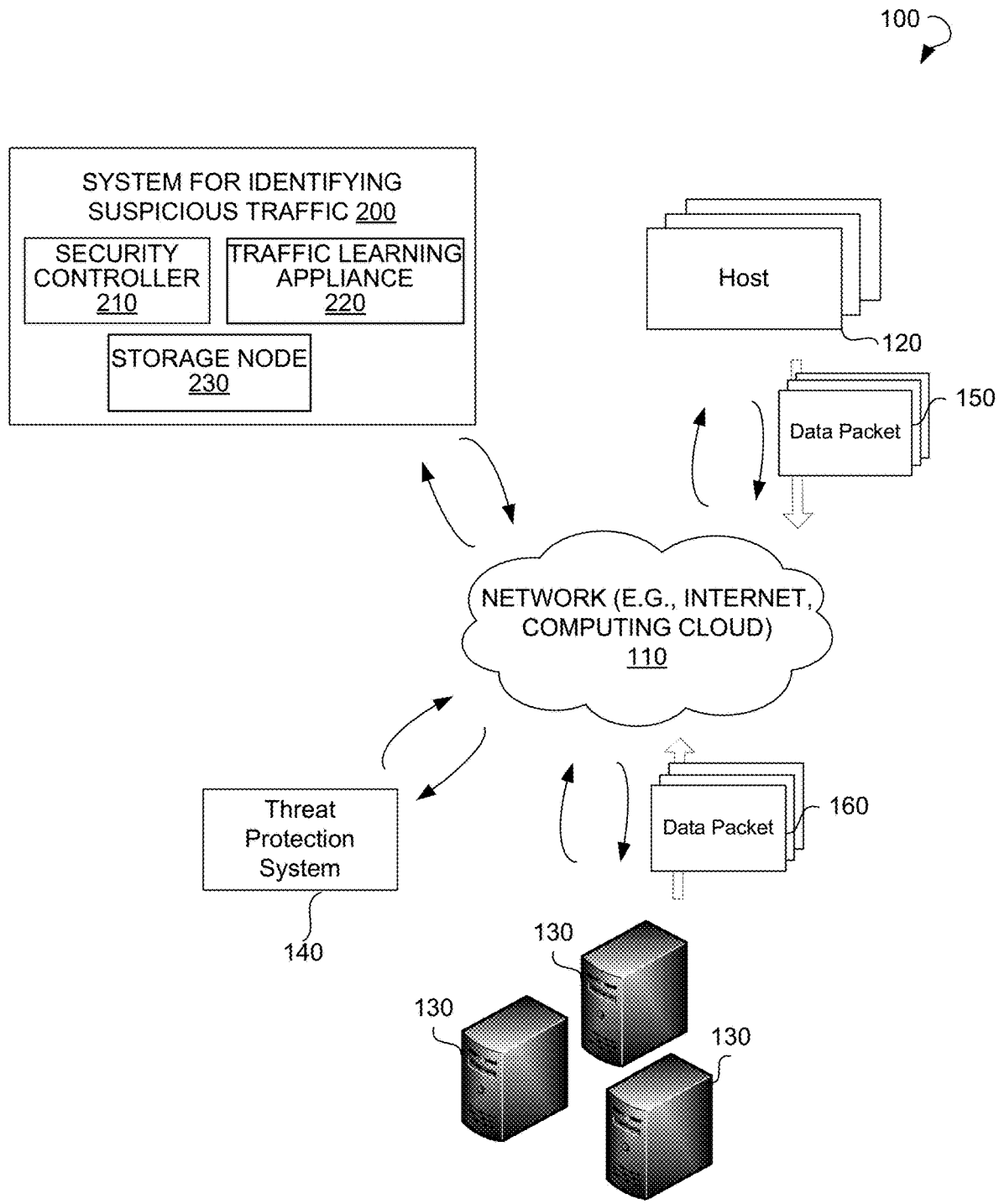
FIG. 1 shows an environment, within which methods and systems for identifying suspicious traffic can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to identifying suspicious traffic in a data network. To protect network devices, e.g., servers, of the data network from being attacked, a system for identifying suspicious traffic can be provided. The system may operate as a traffic learning system configured to collect and analyze data associated with traffic of the data network. Moreover, the system may operate as a mitigation system directed to preventing attacks on the network devices based on the analysis of the collected data.

Specifically, one or more traffic learning appliances may be provided in the data network. The traffic learning appliances may be responsible for collecting data related to the data traffic directed to and from the network devices of the data network. The collected data may be used to compile statistical data. Specifically, each portion of data may be associated with a specific source identifier, such as an IP address. For example, a host may send data to the server located on the data network, where an IP address of the host is a source identifier. The traffic learning appliances may create a data list associated with the host based on the source identifier. All data related to the source identifier of the host may be stored to one or more data lists. The data lists may be created for a plurality of source identifiers, e.g., for a plurality of hosts. Based on the data lists, a network traffic behavior associated with each of the hosts may be determined, as well as a statistical tolerance zone for each of the parameters of the data traffic may be set.

The system may further include a security controller. The security controller may be responsible for receiving incoming traffic directed to the server. Upon receipt of a data packet from one of the hosts, the security controller may determine a source identifier of the host and access a data list related to this source identifier. The security controller may determine whether the parameters of the data packet received from the host are in line with the network traffic behavior normally exhibited by the host.

Specifically, the security controller may determine whether the parameters of the received data packet are outside the tolerance zone for parameters stored in the data list related to the host. If the parameters of the data packet are outside the tolerance zone, the security controller may classify the data packet as suspicious and initiate a mitigation action. For example, the security controller may drop the data packet or initiate an additional verification to determine whether the data packet is a legitimate data packet. If the additional verification is positive, the data packet may be forwarded to the server.

Referring now to the drawings, FIG. 1 illustrates an environment 100 within which methods and systems for identifying suspicious traffic can be implemented. The environment 100 may include a data network 110, such as the Internet or a computing cloud, a plurality of hosts 120, servers 130, a system 200 for identifying suspicious traffic also referred to as a system 200, and a threat protection system 140. The hosts 120 may include any network appliances, clients, servers, Internet of things (IoT) devices, or other devices connected to the data network 110. In an example embodiment, the hosts 120 may include a personal computer (PC), a laptop, a smartphone, a tablet PC, a television set, a switch, a router, a smart device, home appliances, and so forth. The hosts 120 may send data packets 150 to servers 130. The data packets 150 may be analyzed by the system 200 and forwarded to the servers 130. The servers 130 in turn may send data packets 160 to the hosts 120. The system 200 may collected statistical data related to the data packets 150 and data packets 160 and store the statistical data into the storage node 230. The hosts 120, the servers 130, the system 200, and the threat protection system 140 may be connected to the data network 110.

The data network 110 may be not limited to the Internet or the computing cloud but may include any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network, an Ethernet network, a corporate data network, a data center network, a home data network, a company data network, a cellular network, a Frame Relay network, or an optical network. The data network can further include or interface with any one or more of an RS-232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network 110 may include a network of data processing nodes, also referred to as network nodes, that are interconnected for the purpose of data communication.

The system 200 may include a security controller 210 for analyzing the data traffic currently directed to the servers 130 in order to prevent network attacks on the servers 130. The system 200 may further include a traffic learning appliance 220 for collecting statistical data in respect of the data traffic coming to the servers 130 through the data network 110. The system 200 may further have a storage node 230 for storing the statistical data.

Figure 2:
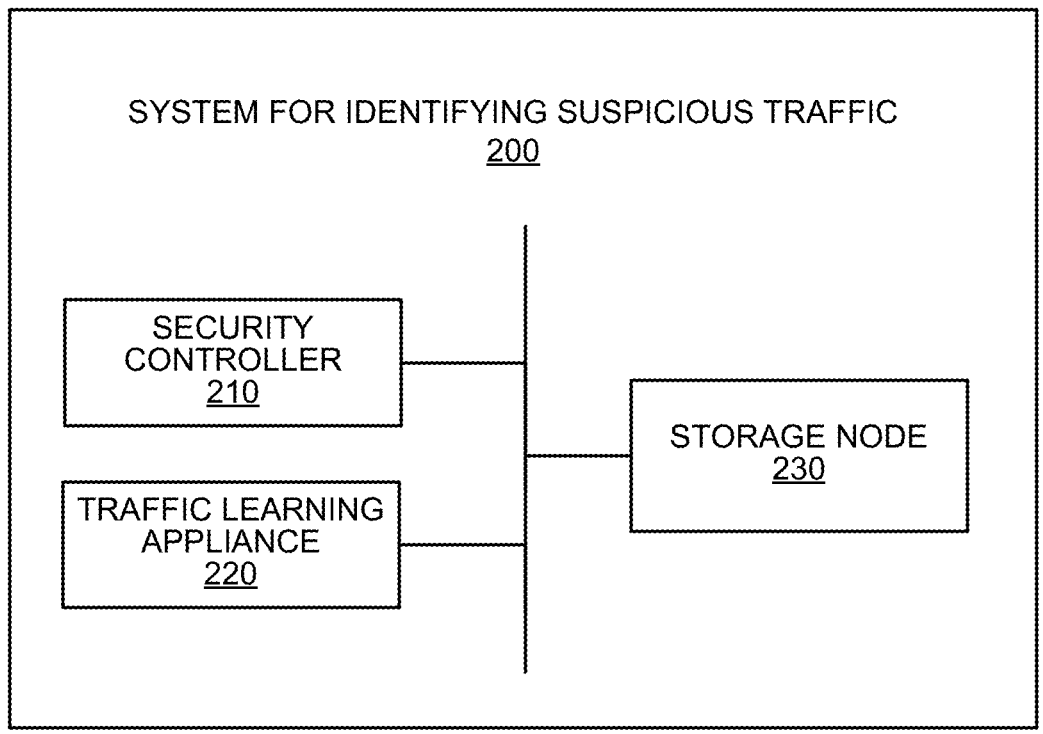
FIG. 2 shows a block diagram illustrating various modules of a system for identifying suspicious traffic, according to an example embodiment.

FIG. 2 shows a block diagram illustrating various modules of a system 200 for identifying suspicious traffic, according to an example embodiment. Specifically, the system 200 may include a security controller 210, a traffic learning appliance 220, and a storage node 230. The operations performed by the components of the system 200 are described in further detail with reference to FIG. 3.

FIG. 3 shows a process flow diagram of a method 300 for identifying suspicious traffic, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with compiling, by at least one traffic learning appliance, statistical data for a plurality of hosts at operation 302. In an example embodiment, the statistical data include one or more of the following: a client address, a server address, a host address, a packet header, a packet size, data characteristics of data packets associated with the plurality of hosts, an amount of traffic, bandwidth associated with traffic, a traffic direction, packet content measurements, frequency of sending traffic to or by the plurality of hosts, an inbound traffic amount, an outbound traffic amount, an inbound traffic versus outbound traffic rate, an average data packet length, data packet sequence, time gap between data packets, a list of network appliance that previously communicated with each other, and so forth. The compiling of the statistical data for the plurality of hosts may include collecting the statistical data based on source identifiers associated with each of the plurality of hosts. The source identifier of a host may include, for example, an IP address or any other network identifier.

The method 300 may further include generating, by the at least one traffic learning appliance, data lists for with the plurality of hosts based on the statistical data at operation 304. The data lists may be stored in a storage node. Based on the statistical data, the at least one traffic learning appliance may determine a network traffic behavior associated with each of the plurality of hosts. Therefore, the data lists may store data related to the network traffic behavior of each of the plurality of hosts.

The method 300 may continue with receiving, by a security controller, a data packet from a host of the plurality of hosts at operation 306. The data packet may be associated with a plurality of parameters. The data packet may be a data packet sent by the host to a server.

The security controller may be communication with the at least one traffic learning appliance and may have an access to the data lists. The method 300 may further include analyzing, by the security controller, one or more of the plurality of parameters associated with the data packet using the data lists at operation 308.

The method 300 may continue with determining, by the security controller, based on the analysis, that the one or more of the plurality of parameters are outside a predetermined tolerance zone at operation 310. In an example embodiment, based on the determining that the one or more of the plurality of parameters are outside the predetermined tolerance zone, the data packet may be classified to be an intrusion traffic. Therefore, based on the determination that the one or more of the plurality of parameters are outside the predetermined tolerance zone, the security controller may selectively initiate a mitigation action at operation 312. In an example embodiment, the mitigation action may include one or more of the following: dropping the data packet, adding the host associated with the data packet to a black list, performing additional verification, redirecting the data packet to a threat protection system, and so forth. The additional verification may include, for example, a two-factor verification or any other type of verification. If the additional verification shows that the data packet is a legitimate data packet, the security controller may forward the data packet to a server. If the additional verification shows that the data packet is an intrusion data packet, the security controller may drop the data packet. In an example embodiment, the intrusion data packet may be associated with a one of the following attacks: a DOS attack, a DDOS attack, a TCP ACK+SYN attack, a DNS water torture attack, a DNS reflection attack, a DNS amplification attack, and a TCP reflection attack.

In an example embodiment, in case the mitigation action is the redirection of the data packet to the threat protection system, the threat protection system may receive the data packet, process the data packet, and modify the data packet based on predetermined rules. The threat protection system may send the modified data packet to the security controller for further forwarding to the server.

Figure 4:
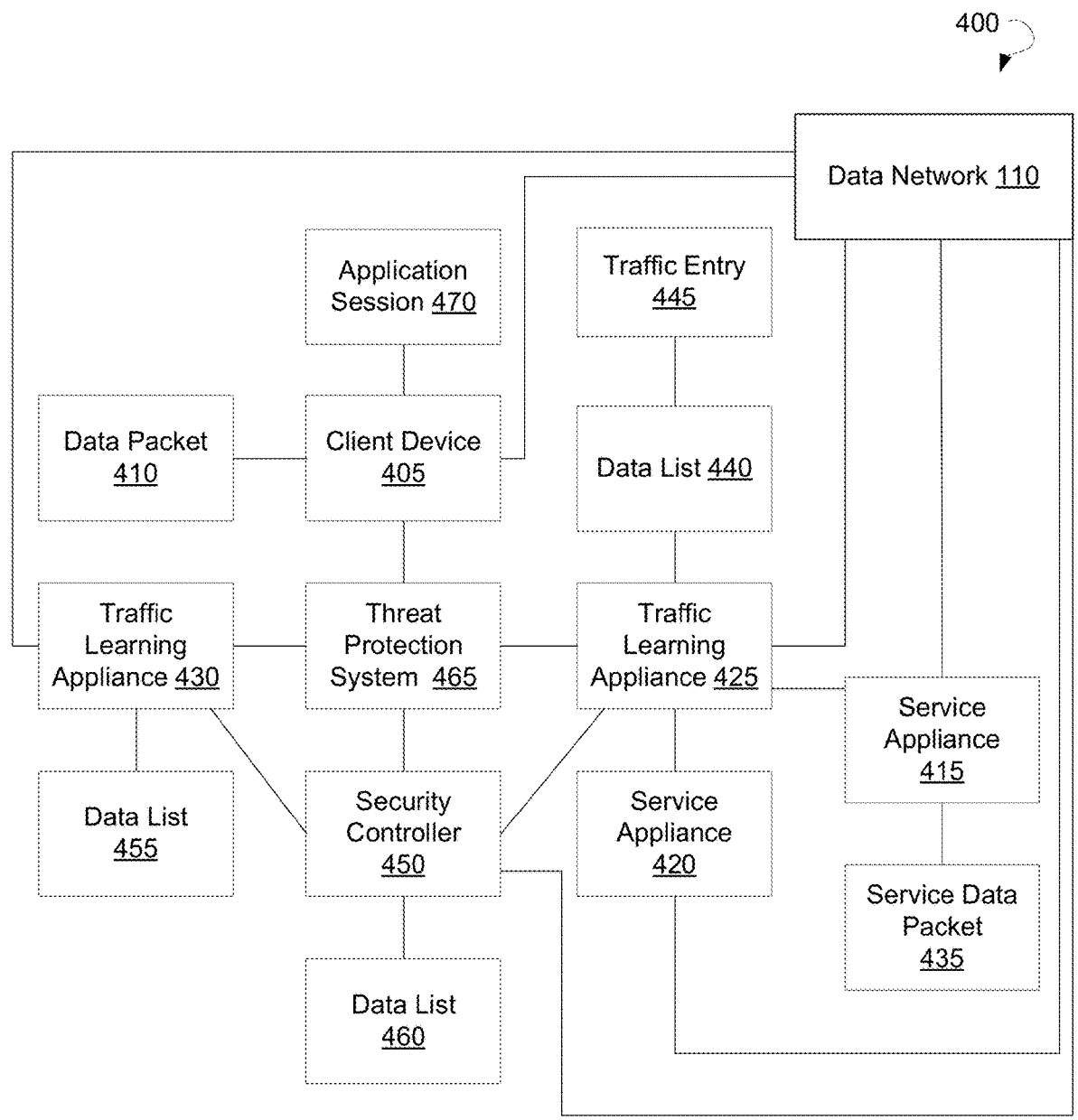
FIG. 4 illustrates identifying suspicious network traffic in a secure data network using traffic learning appliance, according to an example embodiment.

FIG. 4 is a block diagram 400 illustrating an exemplary embodiment of identifying suspicious network traffic in a secure data network using traffic learning appliance. In an example embodiment, a host shown as a client device 405 sends a data packet 410 to a server shown as a service appliance 415 via a data network 110. Several traffic learning appliance may be provided to protect the servers from network attacks, such as the service appliance 415 and a service appliance 420. The traffic learning appliances are shown as a traffic learning appliance 425 and a traffic learning appliance 430. Each of the traffic learning appliance 425 and the traffic learning appliance 430 may connect to one or more servers, such as the service appliance 415 and the service appliance 420.

In an example embodiment, the traffic learning appliance 425 may receive the data packet 410 sent by the client device 405. The traffic learning appliance 425 may process the data packet 410 in order to learn about network traffic towards the service appliance 415, as well as to learn network traffic transmitted from the service appliance 201, such as a service data packet 435 sent by the service appliance 415 to the client device 405.

The traffic learning appliance 425 may have access to a data list 440 stored in a storage node (not shown). The data list 440 may store a network traffic behavior of all hosts, such as client devices, that previously had network sessions with the servers. The traffic learning appliance 425 may match parameters related to the data packet 410 against data stored in the data list 440 to select a matching traffic entry 445 from the data list 440. Specifically, the traffic learning appliance 425 may inspect the data packet 410 to determine a source identifier related to the client device 405, such as an IP address or any other network identifier. The data list 440 may store source identifiers and all parameters collected in respect of the data traffic related to the source identifiers.

In an example embodiment, the traffic learning appliance 425 may not find a matching traffic entry in the data list 440. In this case, the traffic learning appliance 425 may create the traffic entry 445. Specifically, the traffic learning appliance 425 may retrieve traffic parameters from the data packet 410 and record the source identifier associated with the client device 405 and the traffic parameters into the traffic entry 445. The traffic learning appliance 425 may store the updated traffic entry 445 into the data list 440.

In a further example embodiment, the traffic learning appliance 425 may receive the service data packet 435 sent by the service appliance 415. The service data packet 435 may be received before receiving the data packet 410 from the client device 405. The traffic learning appliance 425 may match the service data packet 435 against the data list 440. In case the traffic learning appliance 425 determines there is no match in the data list 440, the traffic learning appliance 425 may create the traffic entry 445 and store traffic information related to the service data packet 435 to the traffic entry 445. In case the traffic learning appliance 425 determines the traffic entry 445 matches the parameters related to the service data packet 435, the traffic learning appliance 425 may retrieve the traffic entry 445 from the data list 440. The traffic learning appliance 425 may retrieve traffic information from the service data packet 435 and record the retrieved traffic information into the traffic entry 445. The traffic learning appliance 425 may further store the updated traffic entry 445 into the data list 440.

In an embodiment, the traffic entry 445 was previously created based on learning and recording a previously received data packet from the client device 405 or a previously received service data packet from the service appliance 420.

The data list 440 may store a learnt network traffic condition between the client device 410 and the service appliance 415. Over a period of time, upon recording a plurality of data packets between a plurality of client devices and the service appliance 415 and the service appliance 420, the traffic learning appliance 425 may store a learnt network traffic condition or network traffic behavior of each client device and service appliance over the period of time into the data list 440.

The traffic learning appliance 425 may connect to a security controller 450 and send the data list 440 to the security controller 450. Furthermore, the security controller 450 may connect to a plurality of traffic learning appliances such as the traffic learning appliance 425 and the traffic learning appliance 430. The security controller 450 may receive the data list 440 from the traffic learning appliance 425 and data list 455 from the traffic learning appliance 430. In an example embodiment, the security controller 450 may combine the data list 440 and the data list 455 into a combined data list shown as a data list 460. The security controller 450 may receive the data list 440 from the traffic learning appliance 425 from time to time, periodically, a scheduled time, upon a request by a threat protection system 465, or a request by a network administrator.

In an example embodiment, the data list 460 may include information collected in associated with a data traffic from/to a plurality of hosts, such as the client device 405. The information stored in the data list 460 may be categorized based on a variety of parameters. The information related to a host may be stored into a profile associated with the host. Profiles may be created for clients, for sessions, for servers, for particular clients going to a particular server or service, and so forth. In other words, the data list 460 may be a historic database storing network traffic parameters collected and/or categorized based on source identifiers. Statistical compilation approaches, heuristic approaches, big data algorithms, machine learning techniques, and deep learning may be used to analyze the collected data related to the data traffic passing through the data network to obtain the historic database. In fact, the data list 460 may store data showing usual (i.e., average) behavior of the data traffic associated with each host and/or source identifier in the data network.

The traffic learning appliance 425 may send the data list 440 to the security controller 450 from time to time, periodically, at a scheduled time, upon a request by the security controller 450, or a request by a network administrator. The traffic learning appliance 350 may reset the data list 440 from time to time, periodically, at a scheduled time, or upon a request to start recording network traffic for a next time period. The traffic learning appliance 350 may send the data list 440 to the security controller 450 prior to resetting the data list 440. The scheduled time can be yearly, daily, hourly, every 10 minutes, every morning/mid-day/evening/midnight, weekly or other time schedule.

The security controller 450 may connect to the threat protection system 465, which may have one or more security policies to screen receiving data packets. Specifically, the threat protection system 465 may receive and examine the data packet 410. Additionally, the threat protection system 465 may receive the data list 460 from the security controller 450 and use the data list 460 to examine the data packet 410. The threat protection system 465 may match the data packet 410 against the data list 460. In an example embodiment, the data packet 410 sent by the client device 405 is not related to any application session. In another example embodiment, the data packet 410 sent by the client device 405 is a data packet of an application session 470 between the client device 405 and the service appliance 415. The data list 440 may include information related to the application session 470 or the client device 405, and thus the data list 460 that includes the data list 440 also may include information related to the application session 470 or the client device 405. The threat protection system 465 may determine that there is a match of parameters related to the data packet 410 and the information stored for the application session 470 or the client device 405 in the data list 460. Based on the match, the threat protection system 465 may consider the data packet 410 to be safe. In this case, the threat protection system 465 may send the data packet 410 towards the service appliance 415. In an example embodiment, the threat protection system 465 may modify the data packet 410 prior to sending the data packet 410 towards the service appliance 415.

Thus, the traffic learning appliance 425 may receive and process the data packet 410 and send the data packet 410 to the service appliance 435. In an example embodiment, the traffic learning appliance 425 may receive the data packet 410 independently from the service appliance 415 receiving the data packet 410. In this case, in case of determining the data packet 410 to be suspicious, the traffic learning appliance 425 may block further data packets from the client device 405.

Furthermore, the traffic learning appliance 425 may receive and process the service data packet 435 and send the service data packet 435 towards the client device 405. In an example embodiment, the traffic learning appliance 425 may receive and process the service data packet 435 independently from the service data packet 435 being sent by the service appliance 435 towards the client device 405.

In one embodiment, the threat protection system 435 may not find a match for the parameters related to the data packet 410 in the data list 460. In this case, the threat protection system 465 may consider the data packet 410 to be an intrusion data packet from the client device 405 and discards the data packet 410. Therefore, the threat protection system 465 may not send the data packet 410 towards the service appliance 420.

Figure 5:
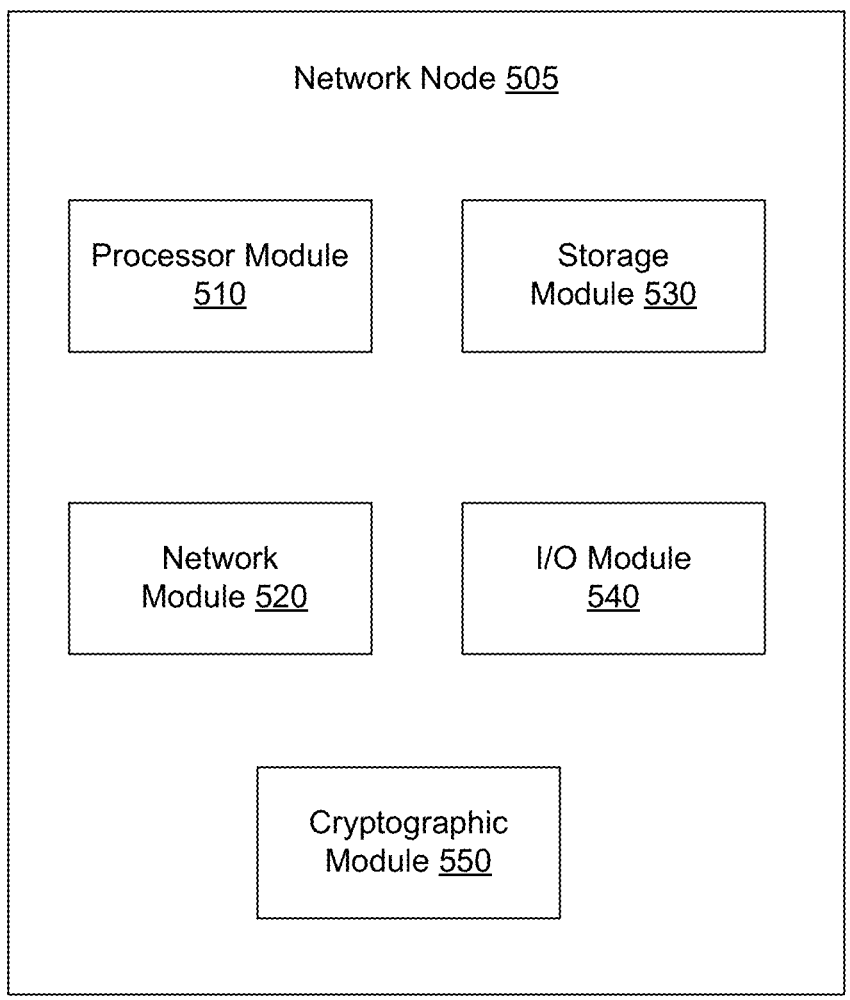
FIG. 5 illustrates a network node, according to an example embodiment.

FIG. 5 is a block diagram 500 illustrating a network node 505, according to an example embodiment. The network node 505 may include a network computer which can be a host, a server, a security controller, and a traffic learning appliance. In an example embodiment, the network node 505 may include a processor module 510, a network module 520, and a storage module 530. In an example embodiment, the processor module 510 may include one or more processors which may be a micro-processor, an Intel processor, an AMD processor, a Microprocessor without Interlocked Pipeline Stages processor, a restricted instruction set computer (RISC) processor, or an Advanced RISC Machine (ARM)-based processor. In an example embodiment, the processor module 510 may include one or more processor cores embedded in a processor. In a further example embodiment, the processor module 510 may include one or more embedded processors, or embedded processing elements in a Field Programmable Gate Array, an Application Specific Integrated Circuit, or Digital Signal Processor. In an example embodiment, the network module 620 may include a network interface such as Ethernet, optical network interface, a wireless network interface, T1/T3 interface, a WAN or LAN interface. In an example embodiment, the network module 620 may include a network processor. In an example embodiment, the storage module 630 include random access memory (RAM), dynamic random access memory, static random access memory, Synchronous Dynamic Random Access Memory, or memory utilized by the processor module 510 or the network module 520. In an example embodiment, the storage module 530 may store data utilized by the processor module 510. In an example embodiment, the storage module 530 may include a hard disk drive, a solid state drive, an external disk, a Digital Versatile Disc (DVD), a Compact Disc (CD), or a readable external disk. The storage module 230 may store one or more computer programming instructions which when executed by the processor module 510 or the network module 520 may implement one or more of the functionality of this present invention. In an example embodiment, the network node 505 may include an input/output (I/O) module 540, which may include a keyboard, a keypad, a mouse, a gesture based input sensor, a microphone, a physical or sensory input peripheral, a display, a speaker, or a physical or sensual output peripheral.

In an example embodiment, the network node 505 may further include a cryptographic module 550, which may include one or more hardware-based cryptographic computing modules.

Returning to FIG. 4, in one embodiment, the client device 405 is a network node, as illustrated in FIG. 5, connected to the data network 110. The client device 405 can be a personal computer, a laptop computer, a tablet, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device comprising at least a network module and at least one processor. In an example embodiment, the application session 470 may include a Hypertext Transfer Protocol (HTTP) session, a file transfer session, a remote access session, a File Transfer Protocol (FTP) session, a virtual network computing session, a remote desktop session, or any server application session. In a further example embodiment, the application session 470 may include a TCP session, a Secure Sockets Layer (SSL) session, or a transport layer session. In one embodiment, the data packet 410 may be an IP data packet.

In an example embodiment, the service appliance 415 or the service appliance 420 is a network node, as illustrated in FIG. 5, connected to the data network 110. The service appliance 415 or the service appliance 420 may be a server device, a server computer, a server load balancer (SLB), an application delivery controller (ADC), or a service gateway. In an example embodiment, the service data packet 435 is an IP data packet.

In an example embodiment, the traffic learning appliance 425 or the traffic learning appliance 435 is a network node, as illustrated in FIG. 5, connected to the data network 110. The traffic learning appliance 425 or the traffic learning appliance 435 may have functionality of a SLB, an ADC, an Ethernet switch, and/or an IP router.

In one embodiment, the threat protection system 465 is a network node, as illustrated in FIG. 5, connected to data network 110. The threat protection system 340 may include functionality of a traffic learning appliance, an Ethernet switch, and/or an IP router.

In one embodiment, the security controller 450 is a network node, as illustrated in FIG. 5, connected to the data network 110. In an example embodiment, security controller 450 may have the functionality of a threat protection system, a traffic learning appliance, an Ethernet switch, and/or an IP router.

Figure 6:
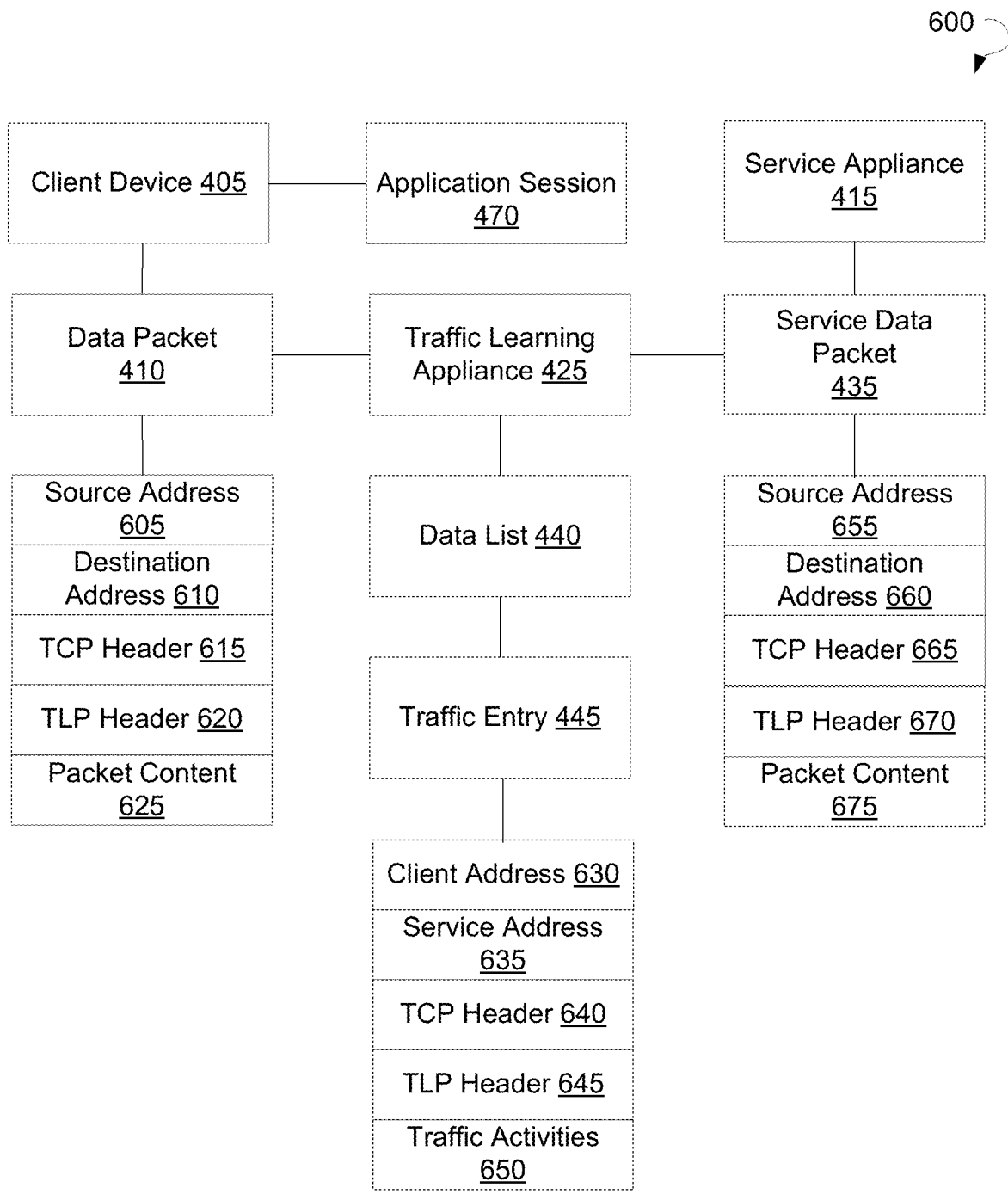
FIG. 6 illustrates recording behavior of a network session data packet, according to an example embodiment.

FIG. 6 is a block diagram 600 illustrating an exemplary embodiment of recording network traffic behavior related to a data packet. A client device 405 may communicate with a service appliance 415 over an application session 470 and send a data packet 410 related to the application session 470 to the service appliance 415. The traffic learning appliance 425 may intercept the data packet 410 and retrieve traffic information from the data packet 410 in order to learn network traffic behavior related to the application session 470 or the client device 405.

The traffic learning appliance 425 may match the data packet 410 with the data list 440. In an example embodiment, the data packet 410 is an IP data packet. In this case, the traffic learning appliance 425 may retrieve a source address 605 and a destination address 610 from the data packet 410. In another example embodiment, the traffic learning appliance 425 may determine that the data packet 410 is a TCP data packet and may retrieve a TCP header 615 from the data packet 410. In a further example embodiment, the traffic learning appliance 425 may determine that the data packet 410 is a transport layer protocol (TLP) data packet and may retrieve a TLP header 620 from the data packet 410. In a further embodiment, the traffic learning appliance 425 may retrieve packet content 625 from the data packet 410.

In an example embodiment, the source address 605 may include an IP address. The source address 605 may further include a source port number. In an example embodiment, the destination address 610 is an IP address. The destination address 610 may further include a destination port number. A source port number or destination port number may include an UDP port number, a TCP port number or a port number for a transport layer protocol. The TCP header 615 may include one or more of a TCP window size, TCP sequence/flag pattern between two TCP data packets in the application session 470, an event time of critical-events, or other TCP header information.

The traffic learning appliance 425 may match the parameters related to the data packet 405 against a traffic entry 445 in the data list 440. The traffic entry 445 may include one or more of a client address 630, a service address 635, a TCP header 640, a TLP header 645, and traffic activities 650.

The client address 630 may include an IP address of a client device. The client address 630 may further include a source port number. The service address 635 may include an IP address, such as an IP address of a network service. The service address 635 may further include a destination port number and a service port number of a network service. The network service may correspond to a network application, such as HTTP application, e-mail service, FTP service, file transfer application, video streaming service, Web server application, Web service, music streaming service, map access, traffic navigation, an online video game, or any other network application. The source port number or destination port number may include an UDP port number, a TCP port number or a port number for a transport layer protocol. The TCP header 640 may include one or more of a TCP window size, TCP sequence/flag pattern between two TCP data packets in the application session 470, an event time of critical-events, or other TCP header information.

The traffic learning appliance 425 may match the source address 605 of the data packet 410 to the client address 630 in the traffic entry 454 of the data list 440 and determine that there is a match. Therefore, the traffic learning appliance 425 may determine that there is a match between the data packet 410 and the traffic entry 445. In a further embodiment, the traffic learning appliance 425 may match the source address 605 and the destination address 610 of the data packet 410 to the client address 630 and the service address 635 of the traffic entry 445 respectively, and determine that there is a match. Therefore, the traffic learning appliance 425 may determine that there is a match between the data packet 410 and the traffic entry 445.

The client address 630 may include an IP address and the traffic learning appliance 425 may match the IP address of the client address 630 against an IP address of the source address 605 to determine if there is a match. In another embodiment, the traffic learning appliance 425 may match the destination address 610 of the data packet 410 to the service address 635 and determine that there is a match. Therefore, the traffic learning appliance 425 may determine that there is a match between the data packet 410 and the traffic entry 445.

In a further embodiment, the client address 630 may include an IP address and a port number. The traffic learning appliance 425 may match the IP address and the port number of the client address 630 against an IP address and a port number in the source address 605 to determine if there is match. The service address 635 may include an IP address. The traffic learning appliance 425 may match the IP address of the service address 635 against an IP address of the destination address 610 to determine if there is a match. In a further embodiment, the service address 635 may include an IP address and a port number. The traffic learning appliance 425 may match the IP address and the port number of the service address 635 against an IP address and a port number in the destination address 610 to determine if there is match.

In a further embodiment, the service address 635 may include one or more addresses corresponding to the one or more service appliances connecting to the traffic learning appliance 425, such as a service appliance 415. The traffic learning appliance 425 may determine that there is no match between the destination address 610 of the data packet 410 and the service address 635 of the traffic entry 445. In this case, the traffic learning appliance 425 may determine that there is no match between the parameters of the data packet 410 and the data list 440. Based on such determination, the traffic learning appliance 425 may classify the data packet 410 to be a suspicious traffic.

In an example embodiment, the client address 630 may include one or more pre-determined IP addresses or a group of IP addresses corresponding to a geo-location, such as a country, a state, a city or a region, to a service provider, to an Autonomous System Number used in Border Gateway Protocol, or to a list of IP addresses. The traffic learning appliance 425 may determine that there is no match between the source address 605 of the data packet 410 and the client address 630 of the traffic entry 445. Therefore, the traffic learning appliance 425 may determine that there is no match between the parameters of the data packet 410 and the data list 440. Based on such determination, the traffic learning appliance 425 may classify the data packet 410 to be a suspicious traffic.

In a further embodiment, the traffic entry 652 includes a client address 630 and a service address 635 corresponding to a previously recorded application session. The traffic learning appliance 425 may match the client address 630 to the source address 605 and match the service address 635 to the destination address 610, and determine that there is a match. Based on this match, the traffic learning appliance 425 may determine that the data packet 405 matches the traffic entry 445. The traffic learning appliance 425 may record the packet content 425 into traffic activities 650. The traffic activities 650 may include a session traffic measured in bytes/bits/bandwidth. The traffic learning appliance 425 may update the session traffic of the traffic activities 650 by including the corresponding measurement from the packet content 625. The traffic activities 650 may further include a traffic direction of either inbound or outbound, and the traffic learning appliance 425 may add an indication to the traffic activities 650 that the traffic is inbound.

In a further example embodiment, the traffic entry 445 may include a client address 630 corresponding to a previously recorded data packet. The traffic learning appliance 425 may match the client address 630 to the source address 605 and determine that there is a match. Based on this match, the traffic learning appliance 425 may determine that the data packet 410 matches the traffic entry 445.

In an example embodiment, the traffic entry 445 may include an indication to create a new traffic entry where there is a match. When the traffic learning appliance 445 determines there is a match between the data packet 410 and the traffic entry 445, the traffic learning appliance 425 creates a new traffic entry to record parameters related to the data packet 410.

The traffic learning appliance 425 may determine that there is no match between the data packet 410 and the data list 440 and, based on such determination, may create a new traffic entry. The traffic learning appliance 425 may create the traffic entry 445 to record parameters related to the data packet 410. Specifically, the traffic learning appliance 425 may copy the source address 605 of the data packet 410 into the client address 630 of the traffic entry 445, copy the destination address 610 of the data packet 405 into the service address 635 of the traffic entry 445, copy TCP header 615 of the data packet 410 into the TCP header 640 of the traffic entry 445, record traffic information corresponding to the packet content 1145625, such as packet size, bandwidth, inbound direction, into the traffic activities 650 of the traffic entry 445. The traffic learning appliance 425 may store or update the traffic entry 445 in the data list 440.

In a further example embodiment, the traffic learning appliance 425 may match the service data packet 435 with the data list 440. The service data packet 435 may be an IP data packet. In this case, the traffic learning appliance 425 may retrieve the source address 655 and destination address 660 from the service data packet 435. The traffic learning appliance 425 may determine that service data packet 435 is a TCP data packet and retrieve a TCP header 665 from the service data packet 435. Furthermore, the traffic learning appliance 425 may determine that service data packet 435 is a TLP data packet and retrieve a TCP header 670 from the service data packet 435. Also, the traffic learning appliance 425 may retrieve the packet content 675 from the service data packet 435.

The traffic learning appliance 425 may match the parameters related to the service data packet 435 against a traffic entry 445 in the data list 440. Specifically, the traffic learning appliance 425 may match the destination address 660 of the service data packet 435 to the client address 630 and determine that there is a match. Therefore, the traffic learning appliance 425 may determine that there is a match between the parameters of the service data packet 435 and the traffic entry 445. In a further embodiment, the traffic learning appliance 425 may match the source address 655 and the destination address 660 of the service data packet 435 to the service address 635 and the client address 630 of the traffic entry 445, respectively, and determine that there is a match. Therefore, the traffic learning appliance 425 may determine that there is a match between the parameters of the service data packet 435 and the traffic entry 445. In one embodiment, the client address 630 may include an IP address and the traffic learning appliance 425 may match the IP address of the client address 630 against an IP address of the destination address 660 to determine if there is a match. In another embodiment, the traffic learning appliance 425 may match the source address 655 of the service data packet 435 to the service address 635 of the traffic entry 445 and determines there is a match. Based on the match, the traffic learning appliance 425 may determine that there is a match between parameters of the service data packet 435 and the traffic entry 445.

In an example embodiment, the traffic entry 445 may include an indication to create a new traffic entry where there is a match. Therefore, when the traffic learning appliance 425 determines there is a match between the service data packet 435 and the traffic entry 445, the traffic learning appliance 425 may create a new traffic entry to record parameters related to the service data packet 435.

In one embodiment, the traffic learning appliance 425 may determine there is no match between the parameters of the service data packet 435 and data list 650 and create a new traffic entry. The traffic learning appliance 425 may create the traffic entry 445 to record parameters related to the service data packet 435. The traffic learning appliance 425 may copies the destination address 660 of the service data packet 435 into the client address 630 of the traffic entry 445, copy the source address 655 of the service data packet 435 into the service address 635 of the traffic entry 445, copy the TCP header 665 of the service data packet 435 into the TCP header 640 of the traffic entry 445, and record traffic information corresponding to the packet content 675, such as a packet size, bandwidth, and inbound direction, into the traffic activities 650 of the traffic entry 445. The traffic learning appliance 425 may store or update the traffic entry 445 in the data list 445.

The traffic learning appliance 425 may process every data packet 410 sent by the client device and service data packet 435 sent by the service appliance. In a further embodiment, the traffic learning appliance 425 does not process every data packet 410 or every service data packet 435 received, but processes received data packet 410 or service data packet 435 based on a sampling function, such as one out of 1000 packets, one out of 10 packets, 500 packets, by time such as one packet every millisecond, 5000 packets every second, by a pre-determined mathematical or statistical model considering outlier, standard deviation, previously recorded data list, or other sampling methods. In a further embodiment, the traffic learning appliance 425 may consider only data packets received from a threat protection system and service data packets received from service appliances connected to the data network.

Figure 7:
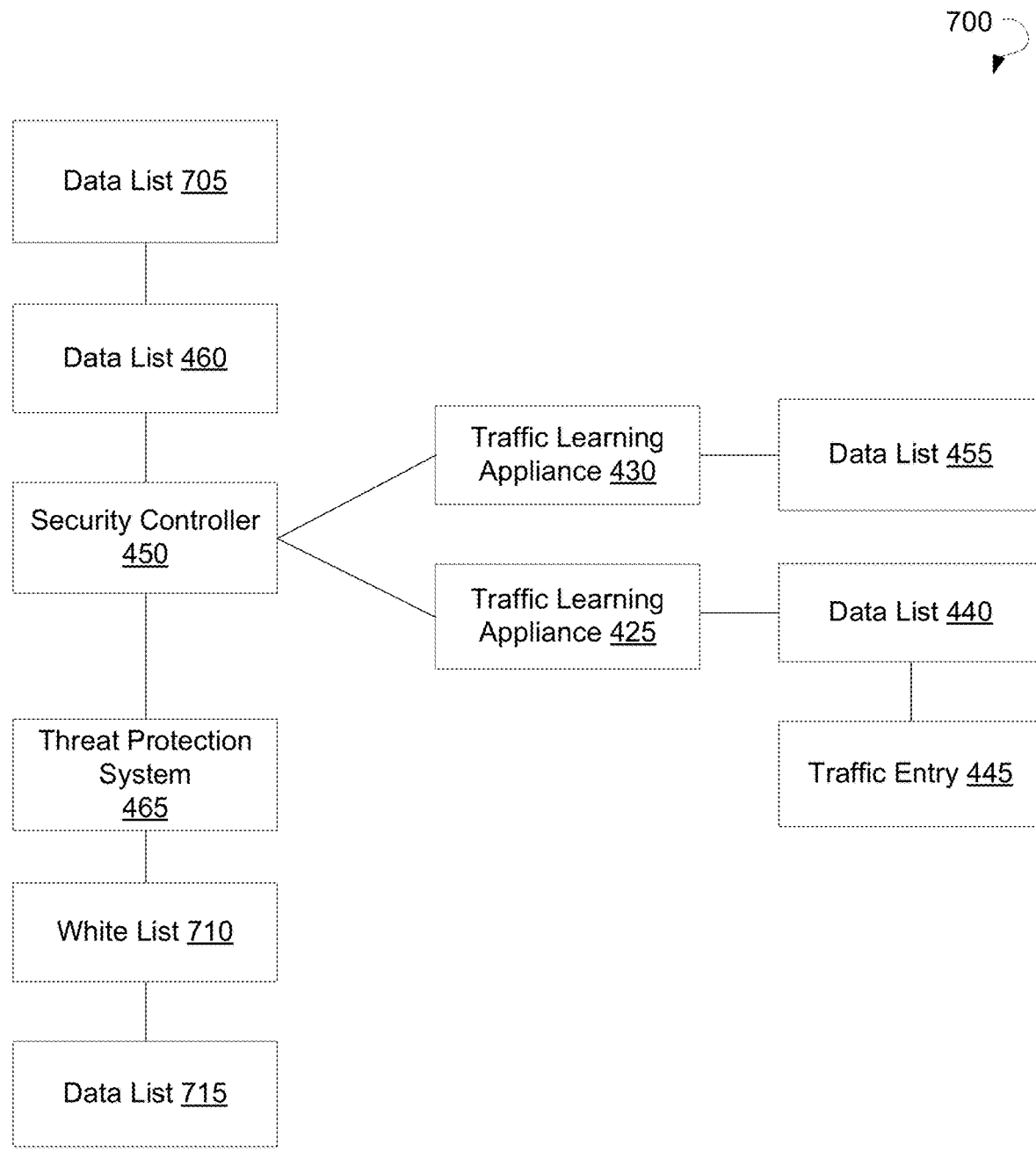
FIG. 7 illustrates aggregating recorded network session traffic behavior, according to an example embodiment.

FIG. 7 illustrates is a block diagram 700 showing an exemplary embodiment of aggregating recorded traffic behavior. A traffic learning appliance 425 may send a data list 440 to a security controller 450. The security controller 450 may receive the data list 440 and store data list 440 into a data list 460. The security controller 450 may store the entire data list 440 into the data list 460, or may retrieve one or more entries such as traffic entry 445 and store the traffic entry 445 into the data list 460. In an example embodiment, the security controller 450 previously received a data list 705 from the traffic learning appliance 425. Upon receiving that data list 440, the security controller 450 may remove the data list 705 from the data list 460 and store the data list 440 into the data list 460.

The security controller 450 may further receive a data list 455 from a traffic learning appliance 430 and store the data list 455 into the data list 460. The security controller 450 may store both the data list 440 and the data list 455 into the data list 460.

The security controller 450 may send the data list 460 to a threat protection system 465. The threat protection system 465 may receive the data list 460 and store the data list 460 into a white list 710. The threat protection system 465 may previously receive a data list 715 from the security controller 450 and the data list 715 may be previously stored in the white list 710. The threat protection system 465 may remove the data list 715 from the white list 710 prior to storing the data list 460 into the white list 710. Alternatively, the threat protection system 465 may update the data list 715 with the data list 460 and store the updated data list 715 into the white list 710.

Figure 8:
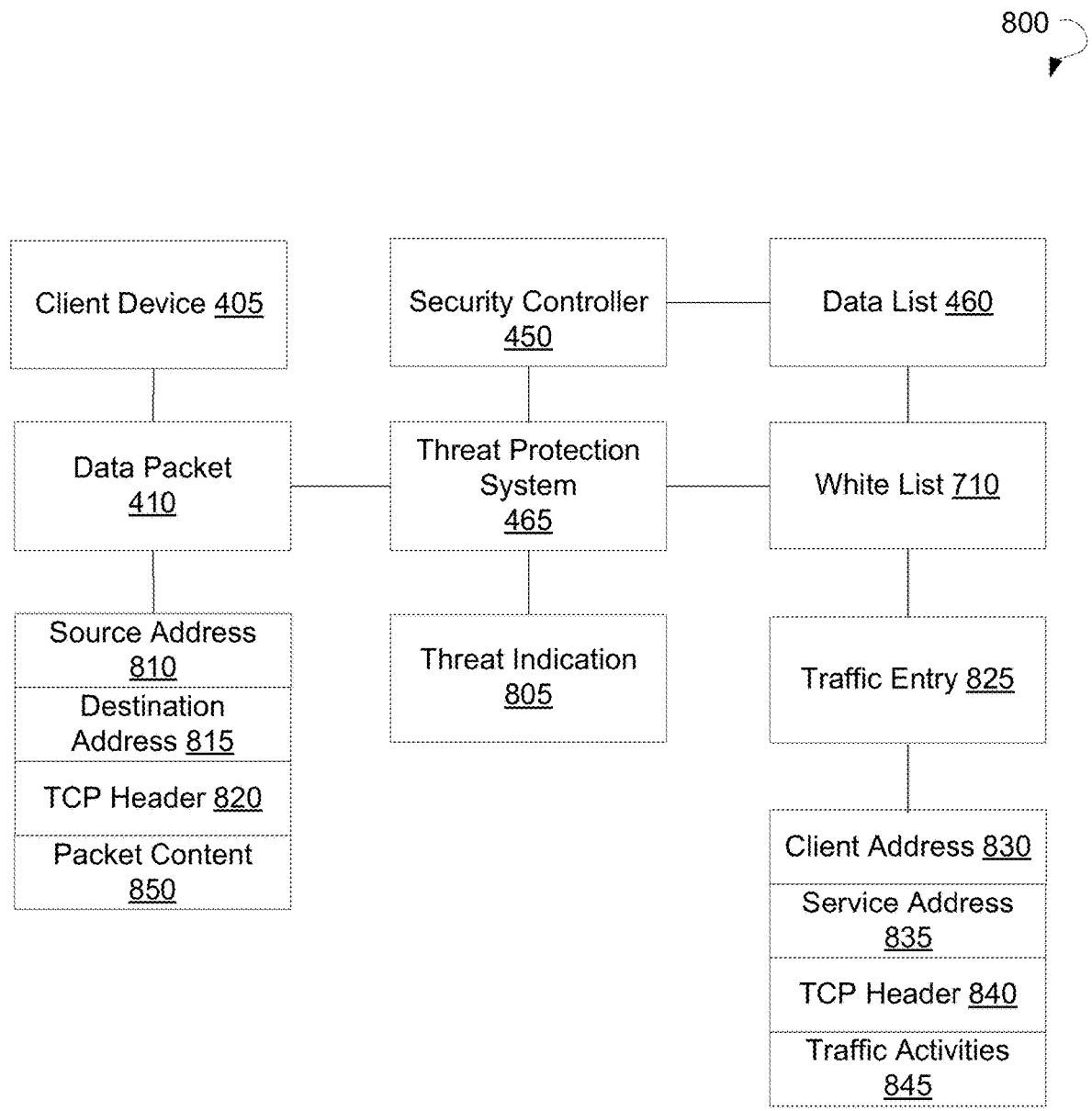
FIG. 8 illustrates an exemplary embodiment of screening incoming network data packets based on learned network session traffic behavior, according to an example embodiment.

FIG. 8 is a block diagram 800 illustrating an exemplary embodiment of screening incoming data packets based on learnt network session traffic behavior. A threat protection system 465 may receive a data packet 410 sent by a client device 405 and screen the parameters related to the data packet 410 against a white list 710. The threat protection system 465 may determine that there is a threat indication 805 indicating that a data network is under attack. The attack may include a DOS attack, a DDOS attack, a reflection DOS attack, a TCP ACK+SYN attack, a DNS DOS attack, a DNS water torture attack, or any form of DOS attack. In an example embodiment, the threat protection system 465 may include a threat detection module (not shown) and may receive the threat indication 805 from the threat detection module. In another embodiment, the threat protection system 465 may receive the threat indication 805 from a network device (not shown), such as a security controller or a threat detection network appliance. The threat protection system 465 may decide to screen the data packet 410 to determine if the data packet 410 is an intrusion data packet or a legitimate data packet.

The threat protection system 465 may communicate to a security controller 450 to receive a data list 460 and store the list 460 into a white list 710. The threat protection system 465 may consider the data list 460 as a current normal network traffic behavior at or prior to the determination of threat indication 805. The threat protection system 465 may use the data list 460 in the white list 710 to screen the data packet 410.

The data packet 410 may include one or more of source address 810, destination address 815, and a TCP header 820. The threat protection system 465 may retrieve at least one of the source address 810, the destination address 815, and the TCP header 820 of the data packet 410 to match against the white list 710. Specifically, the threat protection system 465 may match the data packet 410 against a traffic entry 825 in a white list 710. The traffic entry 825 may include one or more of a client address 830, service address 835, and a TCP header 840. The threat protection system 465 may match one or more of the client address 830, the service address 835, and the TCP header 840 against one or more of the source address 810, the destination address 815, and the TCP header 820 respectively to determine a match. If the threat protection system 465 determines that there is no match between the parameters of the data packet 410 to the traffic entry 825 or to any other traffic entries in the white list 710, the threat protection system 465 may determine that there is no match between the parameters of the data packet 410 and the white list 710 and, hence, may determine that the data packet 410 is an intrusion data packet.

If the threat protection system 465 determines there is a match between the parameters related to the data packet 410 and the traffic entry 825, the threat protection system 465 may determine that data packet 410 to be a legitimate data packet. Additionally, the threat protection system 465 may examine packet content 850, such as a session traffic measured in bytes/bits/bandwidth, and determine that parameters of the data packet 405 are outside a predetermined tolerance zone set in traffic activities 845 of the traffic entry 825, for example 0, 1 kbps, or other low value. In this case, the threat protection system 465 may determine that the data packet 410 is an intrusion data packet. In case the parameters of the data packet 405 are within the predetermined tolerance zone set in the traffic activities 845, the threat protection system 465 may determine that the data packet 410 is a legitimate data packet.

Upon determining that the data packet 410 is the intrusion data packet, the threat protection system 465 may discards the data packet 410. Upon determining that the data packet 410 to be the legitimate data packet, the threat protection system 465 may forwards the data packet 410 to a network device indicated by the destination address 815 of the data packet 410.

The data packet 410 may be is a TCP SYN+ACK reflection attack or other reflection attack data packet and may be sent by the client device 405. In this case, the source address 810 of the data packet 410 may not match any traffic entry in the white list 710. Therefore, the threat protection system 465 may determine that the data packet 410 is an intrusion data packet and discard the data packet 410.

Figure 9:
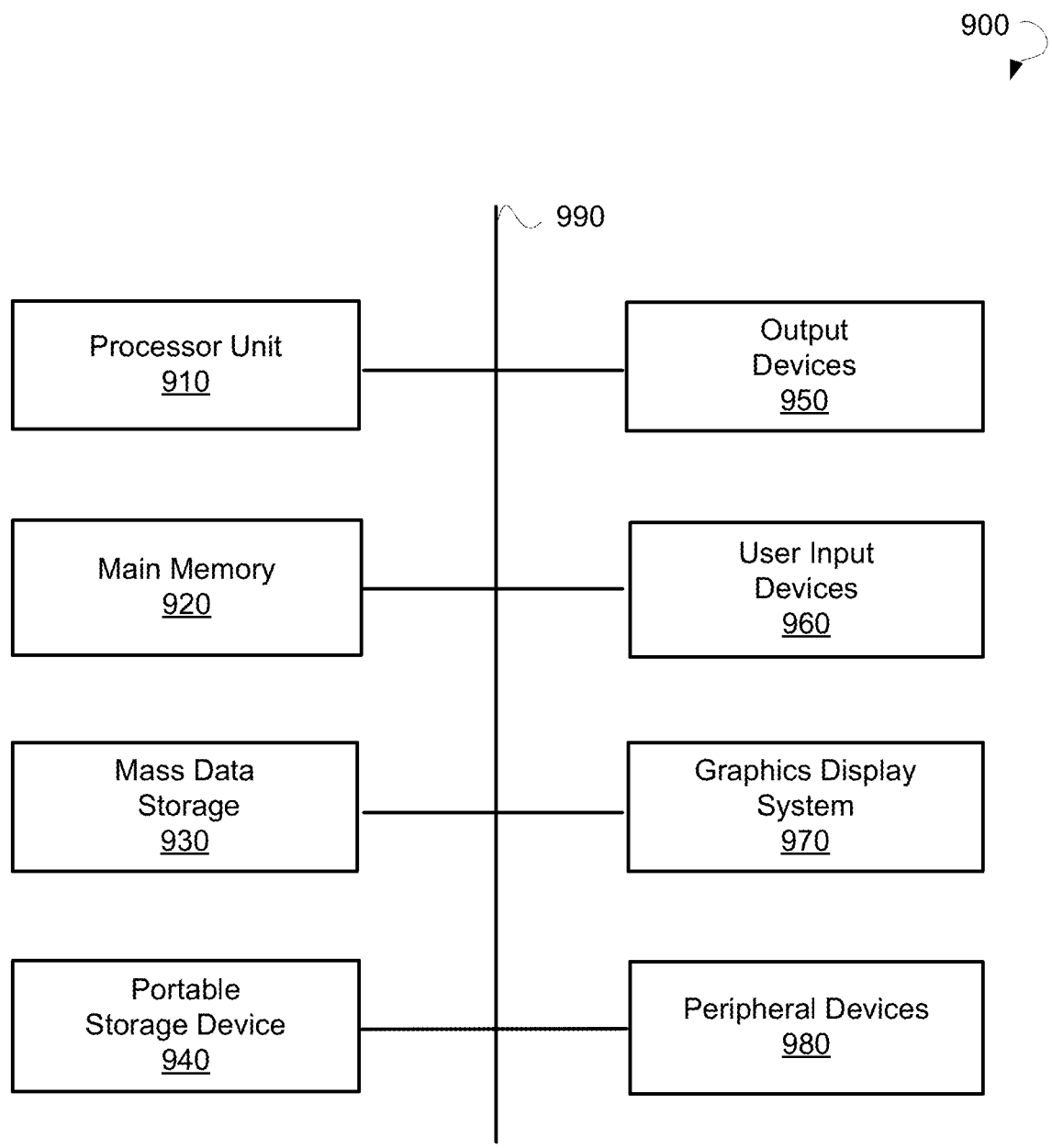
FIG. 9 shows a diagrammatic representation of a computing device for a machine, within which a set of instructions for causing the machine to perform any one or more of the methodologies discussed herein can be executed.

FIG. 9 illustrates a computer system 900 that may be used to implement embodiments of the present disclosure, according to an example embodiment. The computer system 900 may serve as a computing device for a machine, within which a set of instructions for causing the machine to perform any one or more of the methodologies discussed herein can be executed. The computer system 900 can be implemented in the contexts of the likes of computing systems, networks, servers, or combinations thereof. The computer system 900 includes one or more processor units 910 and main memory 920. Main memory 920 stores, in part, instructions and data for execution by processor units 910. Main memory 920 stores the executable code when in operation. The computer system 900 further includes a mass data storage 930, a portable storage device 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor units 910 and main memory 920 are connected via a local microprocessor bus, and mass data storage 930, peripheral devices 980, the portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor units 910. Mass data storage 930 stores the system software for implementing embodiments of the present disclosure for purposes of loading that software into main memory 920.

The portable storage device 940 operates in conjunction with a portable non-volatile storage medium, such as a floppy disk, a CD, a DVD, or USB storage device, to input and output data and code to and from the computer system 900. The system software for implementing embodiments of the present disclosure is stored on such a portable medium and input to the computer system 900 via the portable storage device 940.

User input devices 960 provide a portion of a user interface. User input devices 960 include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 includes output devices 950. Suitable output devices include speakers, printers, network interfaces, and monitors.

Graphics display system 970 includes a liquid crystal display or other suitable display device. Graphics display system 970 receives textual and graphical information and processes the information for output to the display device. Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for identifying suspicious traffic have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for identifying suspicious traffic, the system comprising:
   at least one traffic learning appliance comprising at least one hardware processor, the at least one traffic learning appliance being configured to:
      compile statistical data for a plurality of hosts sending data traffic to a network device, the plurality of hosts including network parties sending the data traffic to the network device, the statistical data being associated with data packets sent by the plurality of hosts to the network device and data packets sent by the network device to the plurality of hosts, wherein the compiling of the statistical data for the plurality of hosts includes collecting the statistical data based on source identifiers associated with each of the plurality of hosts; and
      based on the statistical data, generate data lists associated with the plurality of hosts, wherein a host of the plurality of hosts is associated with a data list of the data lists;
   a security controller in communication with the at least one traffic learning appliance, the security controller being configured to:
      receive a data packet from the host, the data packet being associated with a plurality of parameters, the data packet being sent by the host to the network device;
      analyze one or more of the plurality of parameters of the data packet using the data list, the data list being associated with the host;
      based on the analysis, determine that the one or more of the plurality of parameters are outside a predetermined tolerance zone;
      based on the determination that the one or more of the plurality of parameters are outside the predetermined tolerance zone, classify the data packet as intrusion traffic; and
      based on the classification, selectively initiate a mitigation action associated with the host; and
   a storage node in communication with the at least one traffic learning appliance and the security controller, the storage node being configured to store at least the data lists.

2. The system of claim 1, wherein the statistical data include one or more of the following: a client address, a server address, a host address, a packet header, a packet size, data characteristics of data packets associated with the plurality of hosts, an amount of traffic, bandwidth associated with traffic, a traffic direction, packet content measurements, and frequency of sending traffic to or by the plurality of hosts.

3. The system of claim 1, wherein the mitigation action includes one or more of the following: dropping the data packet, adding the host associated with the data packet to a black list, performing additional verification, and redirecting the data packet to a threat protection system.

4. The system of claim 3, wherein the security controller is further configured to:
based on the additional verification, determine that the data packet is a legitimate data packet; and
forward the data packet to a server.

5. The system of claim 3, wherein the security controller is further configured to:
based on the additional verification, determine that the data packet is an intrusion data packet; and
drop the data packet.

6. The system of claim 3, wherein the security controller is further configured to, in response to redirecting the data packet to the threat protection system, receive a modified data packet from the threat protection system, the modified data packet including the data packet modified by the threat protection system based on predetermined rules.

7. The system of claim 1, wherein the security controller is further configured to determine, based on the statistical data, a network traffic behavior associated with each of the plurality of hosts, wherein the data lists store the network traffic behavior of each of the plurality of hosts.

8. The method of claim 1, wherein the intrusion data packet is associated with a one of the following attacks: a denial of service (DOS) attack, a distributed DOS (DDOS) attack, a Transmission Control Protocol (TCP) ACK+SYN attack, a domain name system (DNS) reflection attack, a DNS water torture attack, a DNS amplification attack, and a TCP reflection attack.

9. A method for identifying intrusion traffic, the method comprising:
compiling statistical data for a plurality of hosts sending data traffic to a network device, the plurality of hosts including network parties sending the data traffic to the network device, the statistical data being associated with data packets sent by the plurality of hosts to the network device and data packets sent by the network device to the plurality of hosts, wherein the compiling of the statistical data for the plurality of hosts includes collecting the statistical data based on source identifiers associated with each of the plurality of hosts;
based on the statistical data, generating data lists associated with the plurality of hosts, wherein a host of the plurality of hosts is associated with a data list of the data lists;
receiving a data packet from the host, the data packet being associated with a plurality of parameters, the data packet being sent by the host to the network device;
analyzing one or more of the plurality of parameters associated with the data packet using the data list, the data list being associated with the host;
based on the analysis, determining that the one or more of the plurality of parameters are outside a predetermined tolerance zone;
based on the determination that the one or more of the plurality of parameters are outside the predetermined tolerance zone, classifying the data packet as intrusion traffic; and
based on the classification, selectively initiating a mitigation action associated with the host.

10. The method of claim 9, wherein the statistical data include one or more of the following: a client address, a server address, a host address, a packet header, a packet size, data characteristics of data packets associated with the plurality of hosts, an amount of traffic, bandwidth associated with traffic, a traffic direction, packet content measurements, and frequency of sending traffic to or by the plurality of hosts.

11. The method of claim 9, wherein the mitigation action includes one or more of the following: dropping the data packet, adding the host associated with the data packet to a black list, performing additional verification, and redirecting the data packet to a threat protection system.

12. The method of claim 11, further comprising:
based on the additional verification, determining that the data packet is a legitimate data packet; and
forwarding the data packet to a server.

13. The method of claim 11, further comprising:
based on the additional verification, determining that the data packet is an intrusion data packet; and
dropping the data packet.

14. The method of claim 11, further comprising, in response to redirecting the data packet to the threat protection system, receiving a modified data packet from the threat protection system, the modified data packet including the data packet modified by the threat protection system based on predetermined rules.

15. The method of claim 9, further comprising determining, based on the statistical data, a network traffic behavior associated with each of the plurality of hosts, wherein the data lists store the network traffic behavior of each of the plurality of hosts.

* * * * *